Patented June 19, 1951

2,557,285

UNITED STATES PATENT OFFICE 2,557,285

MONOAZO DYESTUFFS

Basil Jason Heywood and Arthur Howard Knight, Blackley, Manchester, England, assignors to Imperial Chemical Industries Limited, a corporation of Great Britain No Drawing. Application July 9, 1946, Serial No. 682,311. In Great Britain July 26, 1945

5 Claims. (Cl. 260—152)

The present invention relates to new monoazo dyestuffs, more particularly to such dyestuffs as are suitable for colouring cellulose acetate and nylon fibres and fabrics.

In British Patent No. 441,407 it was proposed to make azo dyestuffs by coupling diazo compounds, suitable for yielding metal complex forming azo dyestuffs, with certain hydroxy derivatives of diphenylene oxide.

According to the present invention we manufacture new monoazo dyestuffs by diazotising the sulphuric ester of a m- or p-aminophenyl hydroxyalkyl ether which may carry further substituents in the phenyl nucleus other than sulphonic acid, carboxyl, hydroxyl, or acylamino groups, and coupling the product with a 2- or 3-monohydroxydiphenylene oxide which may contain further substituents in the aromatic nuclei other than sulphonic acid and nitro groups, provided it remains capable of coupling.

By a further feature of the invention we make the dyestuffs by diazotising a m-or p-aminophenyl hydroxyalkyl ether, which may carry further substituents in the phenyl nucleus other than sulphonic acid, carboxyl, hydroxyl, or acylamino groups and coupling the product with a monohydroxydiphenylene oxide as hereinbefore defined and then converting the monoazo compound so obtained to its acid sulphuric ester by conventional means for example by treatment with sulphuric acid.

By yet a further feature of the invention we colour artificial fibres for example, those comprising cellulose acetate or nylon and fabrics comprising artificial fibres, by means of the new dyestuffs.

The new dyestuffs may conveniently be isolated in the form of their ammonium or alkali metal salts.

Specifically, the new dyestuffs may be structurally described by the following formula

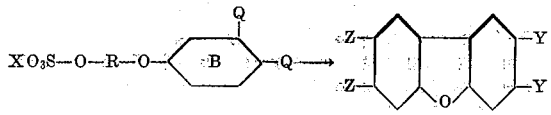

wherein X represents a radical selected from the group consisting of hydrogen, ammonium and alkali-metal radicals, R represents an alkylene radical having from 1 to 5 carbon atoms, B represents a phenyl nucleus selected from the group consisting of phenyl, chlorophenyl and methylphenyl nuclei, one Q represents an amino group, the other Q represents a hydrogen radical, one Z represents a radical selected from the group consisting of hydrogen, methyl, chloro, methoxy, and acetylamino radicals, the other Z represents a hydrogen radical, one Y represents a hydroxyl radical and the other Y represents a hydrogen radical.

The new dyestuffs, in the form of their ammonium or alkali metal salts, are soluble in water and have a very good affinity for cellulose acetate fibres and fabrics which they dye from a neutral, slightly acid or slightly alkaline dyebath in yellow shades which have good fastness to light and are dischargeable. They are also very suitable for printing cellulose acetate fabrics, yielding yellow prints of good light fastness and having a high resistance to sublimation or "marking-off," for example during steaming.

They are, moreover, generally suitable for application to cellulose acetate artificial silk from dilute or "long-liquor" dyebaths, i. e. dyebaths having a dyestuff concentration of the order of 0.05%, such as are employed in dyeing with the winch.

The new dyestuffs may also be used for colouring wool, silk, tin-weighted silk, leather and nylon fibres and fabrics.

As particular diazo components there may be used for example, p-aminophenyl β-hydroxyethyl ether sulphuric ester, p-aminophenyl γ-hydroxypropyl ether sulphuric ester, p-aminophenyl-ε-hydroxyamyl ether sulphuric ester, 2-chloro-4-aminophenyl β-hydroxyethyl ether sulphuric ester, 4-amino-2-methylphenyl β-hydroxyethyl ether sulphuric ester, p-aminophenyl delta-hydroxybutyl ether sulphuric ester, and m-aminophenyl β-hydroxyethyl ether sulphuric ester.

These diazo components are obtainable by treating with sulphuric acid in the corresponding aminophenyl hydroxyalkyl ethers.

As particular coupling components there may be employed for example, 2-hydroxydiphenylene oxide, 3-hydroxydiphenylene oxide, 7-methyl-2-hydroxydiphenylene oxide, 7-chloro-2-hydroxydiphenylene oxide, 7 - methoxy - 2 - hydroxydiphenylene oxide, 8-chloro - 2 - hydroxydiphenylene oxide, 8-methyl-2-hydroxydiphenylene oxide, and 7-acetylamino-2-hydroxydiphenylene oxide.

The method of numbering employed for the diphenylene oxide ring system in this specification is that of "The Ring Index," by A. M. Patterson and L. T. Capell (Reinhold Publishing Corporation, New York), 1940 edition, p. 234, No. 1719, i. e. the oxygen atom is numbered 5.

The invention is illustrated, but not limited, by the following examples, in which the parts are by weight:

Example 1

23.3 parts of p-aminophenyl β-hydroxyethyl ether sulphuric ester are diazotised in 300 parts of water containing 25 parts of 36% hydrochloric acid by the addition of a solution of 6.9 parts of sodium nitrite in 50 parts of water. The diazo solution so obtained is added to a stirred and cooled solution of 18.4 parts of 2-hydroxydiphenylene oxide dissolved in 400 parts of water containing 4 parts of sodium hydroxide and 40 parts of anhydrous sodium carbonate. When coupling is complete, 40 parts of sodium chloride are added to the coupling mixture which is then stirred for 3 hours. The dyestuff is then filtered off, washed with water and dried. Structurally, the new dyestuff in its acid form may be described by the following formula

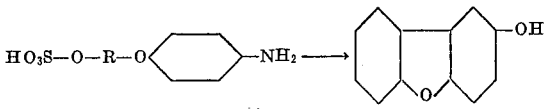

wherein R represents an alkylene radical which, in this case, is $C_2H_4$.

The new dyestuff forms a brownish-yellow powder which dissolves in hot water to give an orange solution and in concentrated sulphuric acid to give a crimson solution. It dyes cellulose acetate and nylon fibres and fabrics in bright yellow shades when applied from a neutral dyebath containing Glauber's salt or sodium chloride. The dyeings possess good fastness to wet treatments and to light and are readily discharged. The new dyestuff is also well suited for printing cellulose acetate artificial silk and the prints have a high resistance to sublimation or "marking-off," for example during steaming. The new dye-stuff is particularly suitable for application to cellulose acetate artificial silk from dilute or "long liquor" dyebaths such as are employed in dyeing with the winch.

Example 2

In place of the 23.3 parts of p-aminophenyl β-hydroxyethyl ether sulphuric ester employed in Example 1, there are used 24.7 parts of p-aminophenyl γ-hydroxypropyl ether sulphuric ester, and a dyestuff is obtained with dyeing and fastness properties similar to those of the dyestuff of Example 1.

Example 3

In place of the 23.3 parts of p-aminophenyl β-hydroxyethyl ether sulphuric ester employed in Example 1, there are used 27.5 parts of p-aminophenyl ε-hydroxyamyl ether sulphuric ester. The new dyestuff, so obtained, forms a brown powder which dissolves in hot water to give a yellow solution and in concentrated sulphuric acid to give a bluish red solution. It dyes cellulose acetate and nylon fibres and fabrics in bright yellow shades when applied from a neutral dyebath containing Glauber's salt or sodium chloride. The new dyestuff is particularly suitable for application to cellulose acetate artificial silk from dilute or "long liquor" dyebaths such as are employed in dyeing with the winch. The dyestuff structurally may be described exactly as that of Example 1 except that, in this particular instance, R represents $C_5H_{10}$.

Example 4

In place of the 23.3 parts of p-aminophenyl β-hydroxyethyl ether sulphuric ester employed in Example 1, there are used 26.8 parts of 2-chloro-4-aminophenyl β-hydroxyethyl ether sulphuric ester. A dyestuff is obtained with dyeing and fastness properties similar to those of the dyestuff of Example 1. Structurally, the new dyestuff in its acid form may be described by the following formula

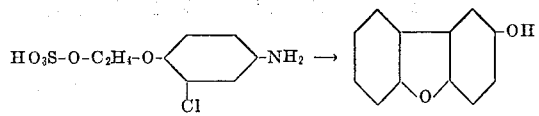

Example 5

In place of the 18.4 parts of 2-hydroxydiphenylene oxide employed in Example 1 there are used 21.9 parts of 8-chloro-2-hydroxydiphenylene oxide. A dyestuff is obtained with dyeing and fastness properties similar to those of the dyestuff of Example 1. The dyestuff in its acid form may be structurally described as follows

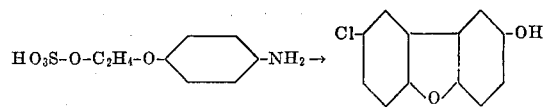

Example 6

In place of the 18.4 parts of 2-hydroxydiphenylene oxide employed in Example 1 there are used 19.8 parts of 7-methyl-2-hydroxydiphenylene oxide. The dyestuff forms a brown powder which dissolves in hot water to give reddish yellow solution and in sulphuric acid to give a crimson solution. Structurally, the dyestuff in its acid form can be shown by the formula

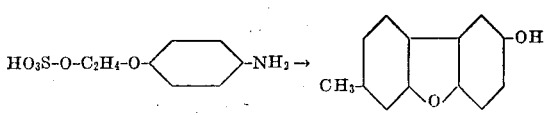

Example 7

The 2-hydroxydiphenylene oxide employed in Example 1 is replaced by the same quantity of 3-hydroxydiphenylene oxide. The dyestuff forms a reddish-brown powder which dissolves in hot water to give an orange solution and in concentrated sulphuric acid to give a dull yellowish red solution. It dyes cellulose acetate artificial silk or nylon fibres or fabric in bright yellow shades when applied from a neutral dyebath containing Glauber's salt or sodium chloride. The new dyestuff is particularly suitable for application to cellulose acetate artificial silk from dilute or "long liquor" dyebaths such as are employed in dyeing with the winch. This particular dyestuff may be described by the following formula

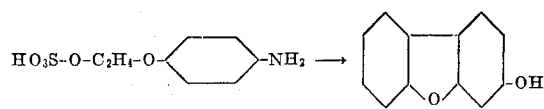

Example 8

15.3 parts of p-aminophenyl β-hydroxyethyl ether are dissolved in a mixture of 400 parts of water and 25 parts of 36% hydrochloric acid. 6.9 parts of sodium nitrite dissolved in 50 parts of water are added.

The diazo solution, so obtained, is added at 5–10° C. to a mixture prepared by dissolving 18.9 parts of 2-hydroxydiphenylene oxide in 400 parts of water and 4 parts of sodium hydroxide, and then adding 21 parts of anhydrous sodium carbonate. When the coupling is complete, the precipitated monoazo compound is filtered off, washed with water and dried.

The dried monoazo compound is powdered and added gradually over about 1 hour, with stirring, to 200 parts of 80% sulphuric acid. Stirring is continued at 15–30° C. for 18 hours. The resulting solution is then poured into a mixture of 300 parts of ice and 200 parts of water. The sulphuric ester of the monoazo compound, so obtained, is separated off and stirred in 400 parts of water. 40% sodium hydroxide solution is then added cautiously until the aqueous medium is faintly alkaline to red litmus. The dyestuff is filtered off and dried. It possesses the same properties as those of the dyestuff of Example 1, and it is believed to be identical with that dyestuff.

*Example 9*

In place of the 23.3 parts of p-aminophenyl p-hydroxyethyl ether sulphuric ester employed in Example 1 there are used 23.3 parts of m-aminophenyl β-hydroxyethyl ether sulphuric ester, and a dyestuff is obtained with dyeing and fastness properties similar to those of the dyestuff of Example 1. This new dyestuff structurally may be described as follows

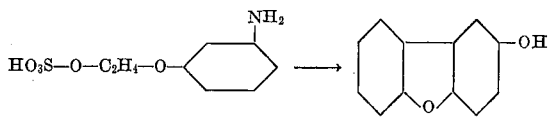

We claim:
1. A monoazo dyestuff which is represented by the formula

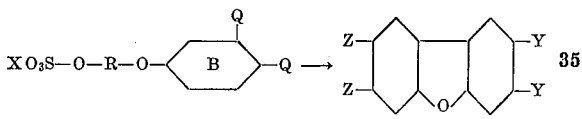

wherein X represents a radical selected from the group consisting of hydrogen, ammonium and alkali-metal radicals, R represents an alkylene radical having from 1 to 5 carbon atoms, B represents a phenyl nucleus selected from the group consisting of phenyl, chlorophenyl and methylphenyl nuclei, one Q represents an amino group, the other Q represents a hydrogen radical, one Z represents a radical selected from the group consisting of hydrogen, methyl, chloro, methoxy and acetylamino radicals, the other Z represents a hydrogen radical, one Y represents a hydroxyl radical and the other Y represents a hydrogen radical.

2. A monoazo dyestuff of the formula claimed in claim 1 wherein R represents an ethylene radical.

3. A monoazo dyestuff which in its acid form is represented by the formula:

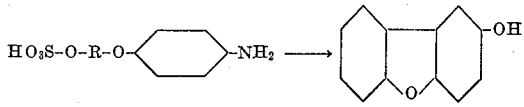

wherein R represents an alkylene radical having from 1 to 5 carbon atoms.

4. A monoazo dyestuff which in its acid form is represented by the formula:

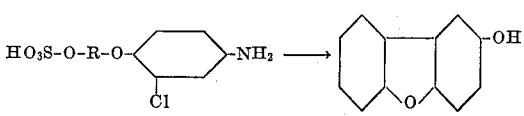

wherein R represents an alkylene radical having from 1 to 5 carbon atoms.

5. A monoazo dyestuff which in its acid form is represented by the formula:

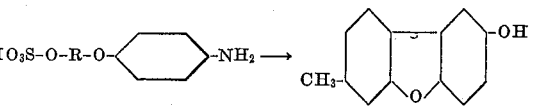

wherein R represents an alkylene radical having from 1 to 5 carbon atoms.

BASIL JASON HEYWOOD.
ARTHUR HOWARD KNIGHT.

REFERENCES CITED

The following references are of record in the file of this patent:

UNITED STATES PATENTS

| Number | Name | Date |
| --- | --- | --- |
| 2,026,908 | Muth | Jan. 7, 1936 |
| 2,128,508 | Stusser et al. | Aug. 30, 1938 |
| 2,138,553 | Muth | Nov. 29, 1938 |
| 2,195,390 | Ellis et al. | Mar. 26, 1940 |
| 2,370,537 | Heywood et al. | Feb. 27, 1945 |